United States Patent [19]

Aisaka et al.

[11] 4,417,401
[45] Nov. 29, 1983

[54] GARMENT MEASURING DEVICE

[75] Inventors: Noboru Aisaka; Shigeru Nishikawa, both of Ibaraki; Atsuo Shibuya, Tokyo; Yasuo Bessho, Ibaraki; Hitoshi Akami, Ibaraki; Shigeo Ogawa, Yatabemachi, all of Japan

[73] Assignees: Agency of Industrial Science & Technology; Ministry of International Trade & Industry, both of Tokyo, Japan

[21] Appl. No.: 363,543

[22] Filed: Mar. 30, 1982

[30] Foreign Application Priority Data

Mar. 31, 1981 [JP] Japan .................. 56-48830

[51] Int. Cl.³ .................................. G01B 5/20
[52] U.S. Cl. .................. 33/175; 33/174 PA; 73/159
[58] Field of Search .......... 33/175, 174 P, 174 PA, 33/174 PB, 15, 17 R, 17 A, 2 R, 2 A; 73/159; 223/66, 68

[56] References Cited

U.S. PATENT DOCUMENTS

| 619,874 | 2/1899 | Dietrich | 33/175 |
| 1,912,691 | 6/1933 | Campbell | 33/2 R |
| 2,675,703 | 4/1954 | Hemmerich et al. | 73/159 |
| 4,137,763 | 2/1979 | Swallow | 73/159 |

Primary Examiner—Harry N. Haroian
Attorney, Agent, or Firm—Oblon, Fisher, Spivak, McClelland & Maier

[57] ABSTRACT

A garment measuring device comprises a standard body resembling a human body and a plurality of contact pieces of curved planes provided with a sensor for detecting the contact pressure exerted by the garment and protrusibly disposed at necessary positions of the standard body. With this device, measurement of a given garment is effected by putting the garment on the standard body, allowing the contact pieces to protrude from the standard body until they reach the garment, and calculating the sizes of the garment on the basis of the amounts of protrusion of the contact pieces.

4 Claims, 7 Drawing Figures

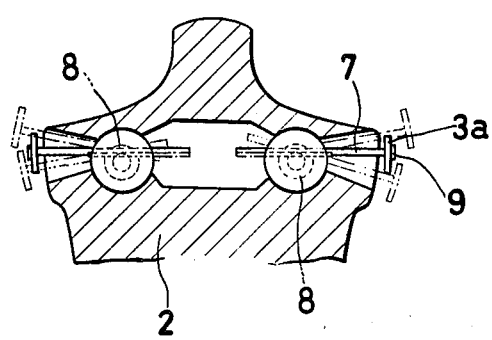
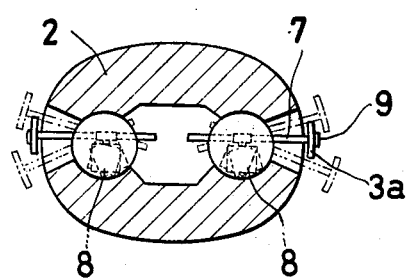
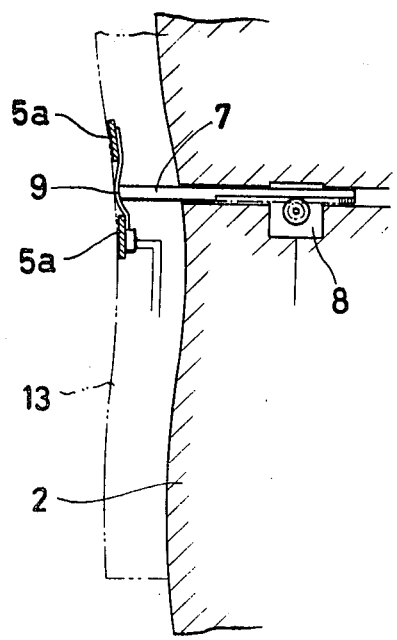
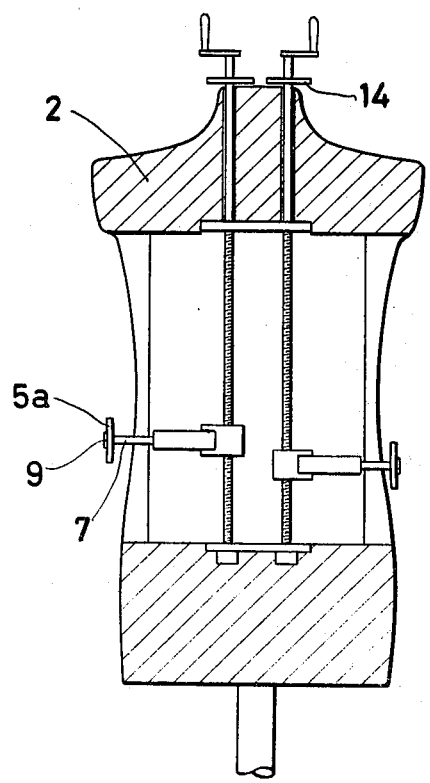

GARMENT MEASURING DEVICE

BACKGROUND OF THE INVENTION

This invention relates to a device for measuring garments.

In Japan, the sizes of ready-made garments are fixed by Japanese Industrial Standards (JIS) and are indicated by numerical symbols such as No. 5 and No. 9 or by alphabetic symbols such as S, M, and L, for example.

In the case of men's outerwear marketed in the United States, chest girth, waist girth, and height are indicated on the individual articles. When a wearer tries garments of one same kind and identically indicated sizes, he sometimes finds that some of them from one maker do not fit his physique in entirely the same way as others from another maker. Part of garments have their sizes indicated by standard body sizes. Unfortunately, there has existed no proper testing method which permits evaluation of the adequacy of the indicated sizes. One possible way of making this evaluation may comprise preparing a multiplicity of dummies of various body forms and sizes specified by JIS, putting garments of indicated sizes on proper dummies, and testing the fit of the garments on the dummies. This method, however, has the disadvantage that the test necessitates preparation of a multiplicity of dummies and the evaluation of garment fit on the dummies depends on the subjective view of persons engaging in the test and, therefore, lacks perfect objectivity.

SUMMARY OF THE INVENTION

An object of this invention is to provide a device for easy and accurate measurement of garments.

To accomplish the object described above according to this invention, there is provided a device for the measurement of garments which comprises a standard body (similar generally in appearance to a dummy) and a plurality of contact pieces of curved lines or curved planes disposed at necessary positions of the standard body and provided with a sensor capable of detecting the contact pressure exerted by a garment under measurement upon the standard body, whereby the measurement of the garment is accomplished by covering the standard body with the garment, causing the contact pieces to protrude automatically or manually until they come into intimate contact with the garment, and determining the sizes of the garment based on the amounts of protrusion of the contact pieces.

In accordance with the present invention, garments of various combinations of sizes can be measured on the basis of the amounts of protrusion of the contact pieces and the standard body can be converted into bodies of various sizes by causing the contact pieces to protrude to suitable amounts. Thus, the garment measuring device of this invention is economical. This device, when connected with a computer, can be utilized for the purpose of automatically rating the body form and physique of a garment wearer. Thus, the device helps to prevent confusion about garment size among consumers and enables a garment producer to effect quality control efficiently and objectively.

The other objects and characteristics of this invention will become apparent from the further disclosure of the invention to be made hereinbelow with reference to the accompanying drawing.

BRIEF DESCRIPTION OF THE DRAWING

FIGS. 3(A) and 3(B) are a sectioned front view and a sectioned plan view respectively of the garment measuring device of this invention, with the contact pieces retained in their severally protruded states.

FIG. 4 is an explanatory diagram illustrating the garment measuring device of the present invention in a state being used for measuring a garment.

FIG. 5 is an explanatory diagram illustrating another embodiment of the garment measuring device according to the present invention.

DESCRIPTION OF PREFERRED EMBODIMENTS

Figure 1:
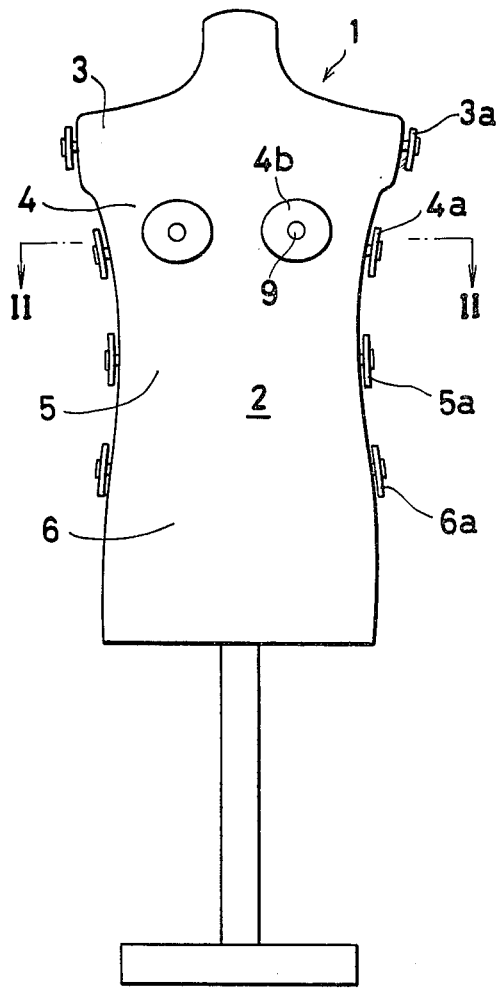
FIG. 1 is a front view of one embodiment of the garment measuring device according to this invention.
Figure 2:
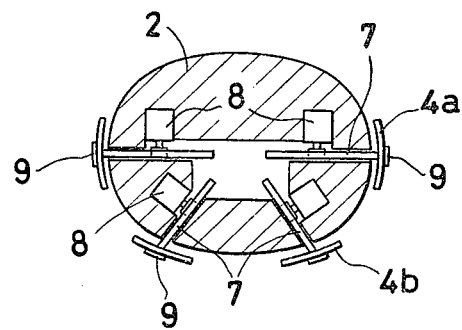
FIG. 2 is a cross section taken along the line II—II in the diagram of FIG. 1.
Figure 6:
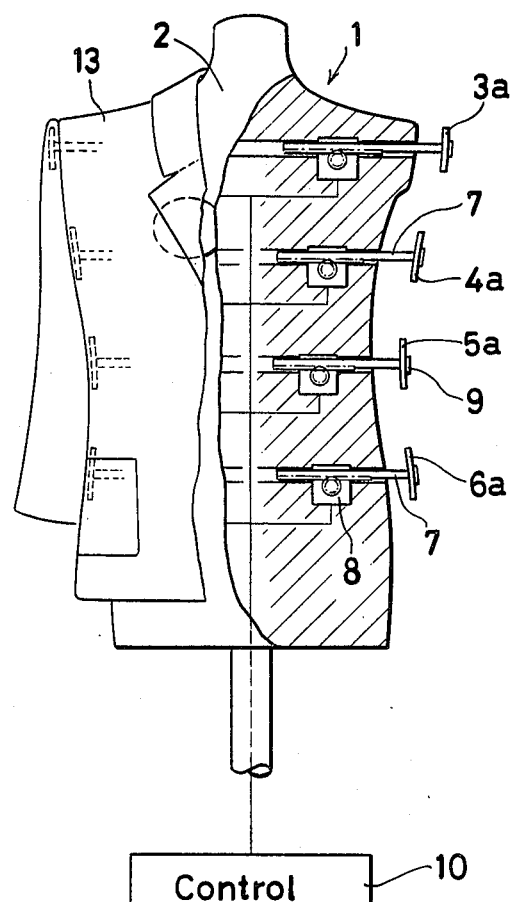
FIG. 6 is an explanatory diagram illustrating yet another embodiment of the garment measuring device according to this invention.

Referring to FIG. 1, a dummy 1 in the garment measuring device has a standard body 2 formed of a shoulder section 3, a chest section 4, an abdominal section 5, a waist section 6, etc. resembling the corresponding regions of the human body. The standard body 2 is provided at such various body positions with contact pieces 3a, 4a, 4b, 5a, 6a of the shape of curved lines or curved planes. These contact pieces are formed of a plastic, wooden, or metallic material or of cardboard paper in patterns conforming to the contours of the body positions. They are supported by protruding levers 7 which rise from the corresponding body positions of the standard body 2. The inner terminals of the protruding levers 7 falling within the periphery of the standard body 2 are connected to the rotary shafts of miniature motors 8 through the medium of a proper transmission mechanism (not shown) such as a pinion and rack or gears as illustrated in FIG. 2. By the rotation of the motors 8, the contact pieces are protruded from the periphery of the standard body 2. By the reverse rotation of the motors 8, the contact pieces are retracted until they come into intimate contact with the periphery of the standard body 2. The contact pieces are provided at their leading ends with a sensor 9 adapted to detect the pressure of contact generated between the contact pieces and the garment under measurement. A semiconductor strain gauge can be advantageously used as the sensor. A detector making use of pneumatics may also be usable.

Now, the contact pieces will be more specifically described below. The contact pieces 3a provided in the shoulder section 3 are intended for defining the breadth of the shoulder. They are formed of the aforementioned material in curved lines or curved planes conforming to the corresponding parts of the contour of the human body. They are desired to be constructed so that they may be positionally adjusted in the vertical directions and horizontal directions so as to conform freely to square shoulders, sloping shoulders, and shoulders of other forms.

In this case, therefore, the miniature motors 8 are set within the standard body 2 in such a manner that they may be swung in the vertical direction as illustrated in FIG. 3(A) or in the horizontal direction as illustrated in FIG. 3(B). By the rotation of these miniature motors 8, the contact pieces 3a can be protruded in a desired direction to a desired extent to obtain a desired form of shoulder in the standard body. The contact pieces 4a, 4b disposed in the chest section 4 are intended to define the circumference of the chest. The contact pieces 4a are laterally movable to determine the breadth of the chest and the contact pieces 4b are longitudinally movable to determine the thickness of the chest. The contact pieces 5a, 6a which are disposed in the abdominal section 5 and the waist section 6 are laterally movable to determine the circumference of the abdomen and that of the waist respectively.

After the garment has been placed over the dummy 1, the contact pieces 3a, 4a, 4b, 5a, and 6a are used to determine the sizes and adjust the shapes of the corresponding positions of the garment. To this end, they are required to form portions of curved lines or curved planes which collectively constitute an envelope approximating the contour of the human body. They sufficiently fulfill their functions when their sizes are enough to permit desired adjustment of the shapes of the corresponding positions of the garment. Their sizes are not desired to be any larger than are required.

Optionally, the aforementioned standard body 2 may be constructed so that the shoulder section 3 is separated from the chest section 4, the chest section 4 from the abdominal section 5, and the abdominal section 5 from the waist section 6 respectively and, consequently, the gaps intervening between them may be suitably varied in accordance with the physique of the wearer for whom the garment is intended. The contact pieces 3a, 4a used in the shoulder section 3 and the chest section 4 can be adapted to be detachably attached to the respective protruding levers, so that they may be freely changed with other contact pieces of a size and a shape better fitting the body form. It is particularly desirable for the contact pieces 4b to be prepared in sizes and shapes fitting the body forms of male and female wearers. Although the aforementioned standard body 2 is illustrated as comprising a shoulder section, a chest section, an abdominal section, and a waist section, other necessary sections may be added or unnecessary sections may be omitted and the number of contact pieces at other positions may be suitably increased or decreased.

With the garment measuring device constructed as described above, determination of sizes of a given garment is effected by first preparing the dummy 1 in a predetermined contour as illustrated in FIG. 4, covering this dummy 1 with the garment under measurement, actuating the miniature motors 8 thereby driving the protruding levers outwardly, stopping the miniature motors 8 after the sensors 9 (semiconductor strain gauges) provided at the leading ends of the contact pieces have come into contact with the rear side of the garment and their contact pressures have built up to a stated value, and measuring with a slide gauge or displaying on a dial gauge the amounts of protrusion of the contact pieces 3a, 4a, 4b, 5a, and 6a. The sizes of the garment are calcuated on the basis of the values thus determined.

Microswitches may be provided as sensors at the leading ends of the contact pieces. They may be designed so that when the contact pressures exerted by the garments on the microswitches have passed a prescribed level, the microswitches are actuated to stop the miniature motor and measure the amounts of protrusion of the respective contact pieces. In this case, all the microswitches to be used must be capable of being actuated by one fixed contact pressure.

Alternatively, one pair of dials 14 may be disposed as illustrated in FIG. 5 so that the rotation of these dials may cause the laterally opposite contact pieces 5a to be protruded independently of each other from the periphery of the dummy 1. If, in this case, the contact pieces are adapted to be freely moved in the vertical direction, then they can be used for measuring the garment at any desired level or providing continuous measurement of the garment throughout the entire height.

The garment measuring device embodied as described above, when connected to a computerized control device, permits a given garment to be automatically measured and rated to find the particular body form and physique of a person whom this garment ideally fits. In this case, the automation called for is attained by connecting the contact pieces 3a, 4a, 4b, 5a, and 6a and their sensors 9 to a control device 10 capable of setting, measuring, and displaying the amounts of protrusion and the magnitudes of contact pressure, and then connecting this control device 10 to an arithmetic device 11 capable of calculating the body form and physique of a person whom the garment fits and further to a display device 12 capable of delivering the outcome of the calculation. Since this display device 12 is solely intended for the delivery of the result of rating, it may be an electronic display unit such as a cathode ray tube, for example. Where the output is desired to be stored, a display unit such as a printer may be advantageously used.

To take measurement of a given garment by use of the device described above, the magnitudes of contact pressure which minimize the looseness of the garment 13 under measurement at the various positions of the standard body are preset in the contact pressure setting section of the aforementioned control device 10. After the garment 13 has been put on the dummy 1, the contact pieces are caused to protrude. When the sensors 9 are brought into contact with the garment and the magnitudes of contact pressure exerted thereon by the garment are measured, the information is conveyed to the control device 10. After the magnitudes of contact pressure have reached their respective preset levels, the contact pieces being protruded are stopped. The amounts of their protrusion are displayed on the display device and, at the same time, fed to the arithmetic device 11. Based on the information thus received, the arithmetic device 11 calculates the body form and physique of a person whom the garment 13 ideally fits. The numerical values of the body form and physique are displayed on the display device 12.

The garment measuring device of this invention can otherwise be used for examining a given garment to determine whether or not this garment suits the body form and physique of a particular person. This use of the device is accomplished by putting the data on the physical dimensions of this person in the arithmetic device 11, allowing this device 11 to calculate the amounts of protrusion of the contact pieces at the various positions of the standard body and forward the results of the calculation to the protrusion setting section of the control device, putting the garment on the dummy 1, causing the contact pieces of the dummy 1 to protrude to the amounts calculated as described above, and allowing the magnitudes of contact pressure exerted by the garment at that time to be displayed on the control device 10. The information on the contact pressure is injected into the arithmetic device 11, which processes the information and determines whether or not the garment fits the body form and physique of the person desiring to wear the garment under measurement. The result of this determination is displayed on the display device 12. In this case, the possibility of the garment being broken by an increase in the contact pressure can be precluded by fixing limits to the contact pressure and imparting to the control device 10 a function of automatically stopping the protrusion of the contact pieces at the moment that the magnitudes of contact pressure detected are on the verge of exceeding the limits. The fact of this function of the control device coming into operation shows that the garment under measurement is not suitable for the person desiring to wear it.

With the garment measuring device of this invention which is constructed as described above, the sizes of a given garment can be measured scientifically and dummies of various body forms and sizes can be formed by suitable protrusion of the contact pieces from the standard body. In thise sense, the device of this invention is highly economical. By use of this garment measuring device, the sizes of various garments can be measured and the body forms and physiques of persons whom such garments fit can be rated uniformly. It, therefore, serves to reduce consumer dissatisfaction and, at the same time, provide reliable technical criteria for garment makers.

What is claimed is:

1. A device for the measurement of a garment, which comprises a standard body resembling a human body, a plurality of contact pieces provided at stated positions of said standard body, said contact pieces being formed in shapes conforming to the corresponding portions of the contour of the human body, means for protruding said contact pieces from said positions, and sensor means provided on said contact pieces and used for detecting contact pressure exerted by the garment on said contact pieces.

2. A device according to claim 1, wherein the sensor means is a semiconductor strain gauge.

3. A device according to claim 1, wherein the sensor means is a microswitch.

4. A device according to claim 1, wherein the contact pieces are protruded by the rotation of a miniature motor.

* * * * *